H. C. OSBORN.
ENVELOP SEALER.
APPLICATION FILED FEB. 19, 1910. RENEWED JULY 20, 1912.
1,109,011.                                Patented Sept. 1, 1914.
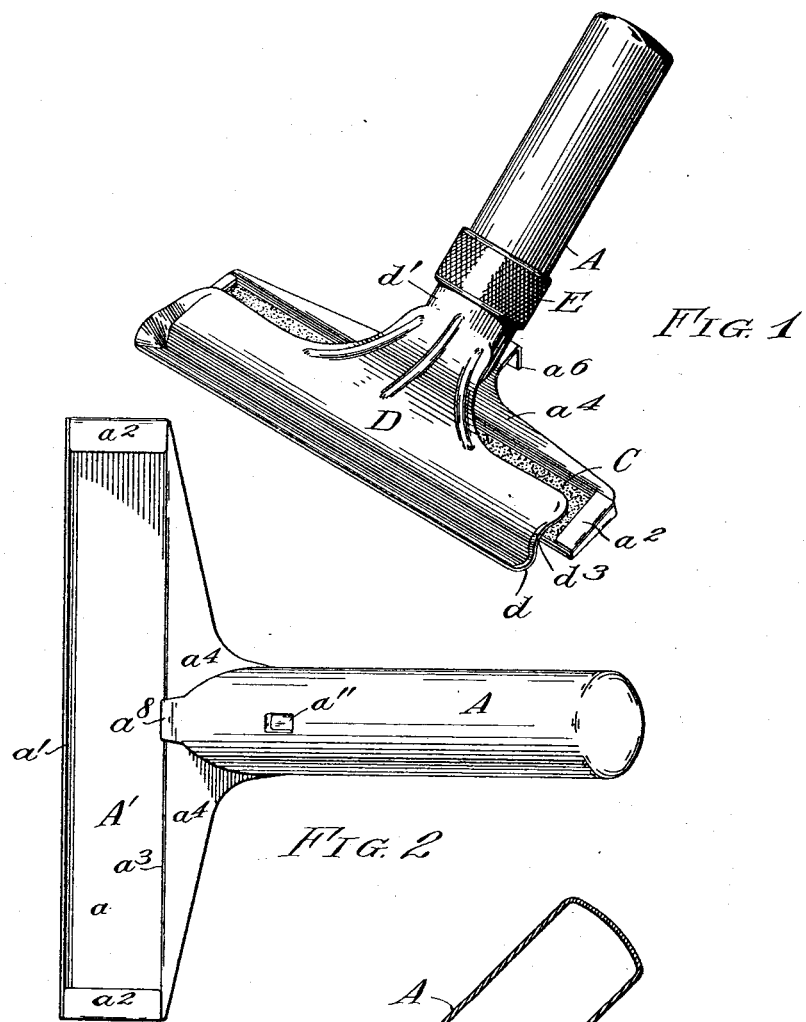
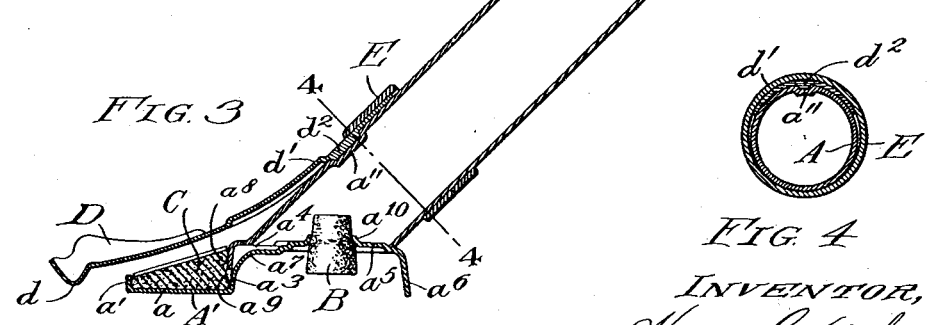

UNITED STATES PATENT OFFICE.

HENRY C. OSBORN, OF CLEVELAND, OHIO, ASSIGNOR TO THE SAUNDERS SEALER COMPANY, OF CLEVELAND, OHIO, A CORPORATION OF OHIO.

ENVELOP-SEALER.

1,109,011. Specification of Letters Patent. Patented Sept. 1, 1914.

Application filed February 19, 1910, Serial No. 544,807. Renewed July 20, 1912. Serial No. 710,699.

*To all whom it may concern:*

Be it known that I, HENRY C. OSBORN, a citizen of the United States, residing at Cleveland, in the county of Cuyahoga and State of Ohio, have invented a certain new and useful Improvement in Envelop-Sealers, of which the following is a full, clear, and exact description, reference being had to the accompanying drawings.

The object of this invention is to provide a very simple and cheap, and at the same time, effective hand tool for sealing envelopes.

The invention is of that class wherein there is a reservoir within a handle, a wick-trough fed thereby and adapted to extend beneath the envelop flap, and a presser plate carried by the handle and adapted to operate on top of the flap to press on the envelop body.

The invention is in the nature of an improvement on the envelop moistener and sealer shown in Patent No. 804,886 to D. G. Saunders, Jr., and it consists of the construction and combination of parts by which I obtain the desired simplicity and efficiency, as substantially shown in the drawing herein, and as hereinafter more fully described.

In the drawings, Figure 1 is a perspective view of my envelop sealer complete; Fig. 2 is a plan of the member which comprises the trough and handle; Fig. 3 is a cross section along the axis of the handle; Fig. 4 is a cross section through the handle, as indicated by the line 4—4 of Fig. 3.

The main body of my sealer comprises a handle portion A and a trough portion $A^1$, rigid therewith. These two members are preferably made of sheeet metal and brazed, or otherwise secured at their junction. The handle A is a tubular member having a closed upper end, as shown. The trough portion $A^1$ comprises a base plate $a$, a front flange $a^1$, turned-over ends $a^2$, and a rear wall $a^3$ which rises at right angles to the base $a$ and then turns toward the handle by wings $a^4$, which merge into a portion $a^5$ beneath the handle. This portion $a^5$ constitutes the bottom of the reservoir within the handle. Behind the bottom, the portion $a^5$ is flanged downwardly, as at $a^6$, to a point substantially in the plane of the bottom $a$, so as to form a support for the tool, enabling it to stand in the position shown in Fig. 3.

At the center of the tool, the wings $a^4$ are depressed, as shown at $a^7$, in Fig. 3, so as to make a passageway from the reservoir to the trough. At the lower end of the front of the handle A is a downwardly extending lip $a^8$, which extends over the passageway $a^7$, leaving a small opening $a^9$ from the reservoir to the trough.

The reservoir referred to is filled through the bottom by an opening in the plate $a^5$, this opening being normally closed by a suitable cork or plug B. The plate is flanged slightly about the opening, as indicated by $a^{10}$, to enable the cork to obtain a good seat. The head of this cork stands within the recess between the trough and the support $a^6$, so that it is at once protected from being dislodged and is out of sight.

C indicates the wick which occupies the trough referred to, and is held in place by the over-turned lips $a^2$. This wick is preferably a piece of felt, substantially fitting the trough and put in place by being bent intermediately and passed, at its ends, under the lips. The felt is of such texture or body as to absorb the water flowing down from the handle, and the opening $a^9$ is small enough so that the water in the handle will not run out in a stream, but will be constantly absorbed by the wick and keep it moist. The opening $a^9$ may therefore be conveniently referred to as a capillary opening.

D indicates the presser plate. This is made of a single piece of sheet metal having a downwardly bent front rib $d$. The presser plate is held a short distance above the wick, with the rib $d$ in front thereof, by means of a shank portion $d^1$, standing alongside of the handle A and removably held thereto by a suitable ring E surrounding the handle and adapted to slide over the shank. This ring E preferably has a roughing surface to enable its convenient manipulation. The shank $d^1$ is provided with an inward projection $d^2$, which is adapted to occupy a depression $a^{11}$ in the handle A, insuring the proper position of the presser plate with reference to the body portion. The ends of the presser plate may be curved upwardly, as shown in $d^3$, to enable the tool to be more conveniently passed across onto opposite sides of the flap.

It is to be understood that, in the operation, the envelop lies face downwardly, with the flap projecting diagonally upward in a natural form, and the tool is passed in a convenient swinging manner lengthwise and downwardly with reference to the flap, so that the flap enters between the trough and presser plate and is moistened by the wick, (which is kept continuously moist by the water in the handle) and by the same movement, is pressed down on the envelop body by the ribbed edge $d$ of the presser plate.

In my invention, there is no danger of flooding the wick with too much water. On the other hand, the wick is maintained moist, as desired, the movement of the tool, in use, assisting the flow of water. Should the wick be found too dry, (as it sometimes is after the tool has been standing for a considerable length of time) it is only necessary to give the tool a slight jar, as by some abrupt movement, to start the flow.

Having thus described my invention, what I claim is:—

1. In an envelop sealer, the combination of a wick-trough made of sheet metal and having a rearwardly extending central portion, a diagonal handle member consisting of a tube permanently closed at its upper end and resting at its lower end on said rearward extension and secured thereto, the rearward extension constituting a bottom for the reservoir within the handle, there being an opening through such bottom, a plug for closing said opening having its head within a recess below the bottom and behind the wick-trough, and a downwardly extending lip on the forward side of the handle leaving a capillary opening connecting the reservoir with the wick-trough, the said rearward extension being turned downwardly behind the plug to provide a supporting foot.

2. In an envelop sealer, a wick-trough having a rearward extension, a depression in said extension, a tubular handle closed at its upper end and secured at its lower end to said extension, a filling opening through the extension into the handle, a lip carried by the handle at its front lower edge and coöperating with said depression to provide a reduced opening from the handle to the wick-trough directly opposite the wick combined with the wick in the said trough, and a presser plate carried by the handle and extending above the wick and having a portion parallel with the wick and in front thereof to engage the outer surface of the envelop flap.

In testimony whereof, I hereunto affix my signature in the presence of two witnesses.

HENRY C. OSBORN.

Witnesses:
W. DUNLOP,
ALBERT H. BATES.

---

Copies of this patent may be obtained for five cents each, by addressing the "Commissioner of Patents, Washington, D. C."